United States Patent Office 3,205,213
Patented Sept. 7, 1965

3,205,213
PRODUCTION OF CIS-1,4 POLYBUTADIENE WITH A TITANIUM TETRACHLORIDE - ALUMINUM ALKYL-IODINE CATALYST
Richard S. Stearns and Andrew Fono, Akron, Ohio, assignors to The Firestone Tire & Rubber Company, Akron, Ohio, a corporation of Ohio
No Drawing. Filed Apr. 13, 1959, Ser. No. 805,707
15 Claims. (Cl. 260—94.3)

This invention relates to a process for the polymerization of butadiene to yield rubbery polymers having structural units largely of the cis-1,4 configuration, and to catalytic compositions useful in said process.

Butadiene, being the simplest and most available of the conjugated dienes, has served as the basis of an extensive technology for the preparation of polymers designed to serve the functions of Hevea rubber. The polymers of butadiene heretofore produced, while they have served as practical substitutes for Hevea rubber in many applications, nevertheless fail to match natural Hevea rubber in many properties, notably in internal friction and resilience properties. It appears that these deficiencies result from the irregular configurations in which the butadiene units enter the polymers heretofore prepared therefrom, and that greatly superior products would result if greater proportions of the butadiene units entered the polymeric chain in what is known as the cis-1,4 configuration, i.e., in the form of units having the formula:

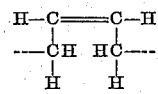

The resultant configuration, since it is homologous to the structure of Hevea rubber, should on theoretical grounds, and in point of fact does, exhibit properties superior to those of the random butadiene polymers heretofore produced.

Accordingly, it is an object of this invention to provide a means for the polymerization of butadiene to yield polymers of superior properties.

A further object is to provide such polymers having superior internal friction and resilience properties in comparison with conventional butadiene polymers.

A further object is to provide a novel catalytic process for the polymerization of butadiene to yield polymers in which the polymeric butadiene unit occurs largely in the cis-1,4 configuration above referred to.

A still further object is to provide novel catalysts for carrying out the process of this invention.

A still further object is to provide a novel method for the preparation of such catalysts.

SYNOPSIS OF THE INVENTION

The above and other objects are secured, in accordance with this invention, by polymerizing butadiene in contact with composite catalysts made up from aluminum alkyls, titanium tetrachloride and elemental iodine. In the final catalyst, the mole ratios of the several components used in the preparation of the catalyst should lie between the following limits:

Table I $$\frac{\text{Moles of aluminum alkyl}}{\text{Moles of titanium tetrachloride}} = 1/1 \text{ to } 30/1$$

$$\frac{\text{Gram atoms of iodine}}{\text{Moles of titanium tetrachloride}} = 0.25/1 \text{ to } 50/1$$

The polymerization is effected by contacting butadiene with the catalyst, preferably at temperatures in the range of −40° C. to +150° C., and also preferably under sufficient pressure to maintain the butadiene in the liquid phase.

THE ALUMINUM ALKYL

Any aluminum alkyl containing one or more alkyl groups containing from 1 to 30 carbon atoms in each alkyl group may be employed in the practice of this invention. Most commonly, there will be employed an aluminum trialkyl; however, there may be employed a dialkyl aluminum monochloride, or monoalkyl aluminum dichloride, it being understood that the mole ratios for the aluminum alkyl specified hereinabove are on the basis of aluminum trialkyls, and that a dialkyl aluminum chloride is equivalent to only two-thirds of a mol of aluminum trialkyl, and that if a dialkyl aluminum chloride is substituted for a trialkyl aluminum, the moles of dialkyl aluminum chloride used must be increased to 1.5 times the moles of trialkyl aluminum which would have been used. Similarly, when a monoalkyl aluminum dichloride is used, the moles of this compound must be three times the moles of trialkyl aluminum which it replaces. Examples of suitable aluminum trialkyls are trimethyl aluminum, triethyl aluminum, tripropyl aluminum, tributyl aluminum, trioctyl aluminum, dimethyl hexyl aluminum, tridodecyl aluminum and the like; of dialkyl aluminum chlorides are dimethyl aluminum chloride, diethyl aluminum chloride, dipropyl aluminum chloride, didodecyl aluminum chloride, methyl hexyl aluminum chloride, and the like; and of monoalkyl aluminum dichlorides are methyl, ethyl, propyl, butyl, hexyl, octyl and dodecyl aluminum dichlorides. It will be understood that any mixtures of the alkyl aluminums above indicated as being suitable may be used, it being further understood that a mole of dialkyl monochlorides or of monoalkyl dichlorides will only count for two-thirds of a mol and one-third of a mole respectively in calculating the ratios of constituents.

PROCEDURES IN PREPARING THE CATALYSTS

The aluminum alkyl, titanium tetrachloride and elemental iodine which are the components of the catalysts of this invention may be brought together and into contact with the butadiene in substantially any order, provided of course, that the overall ratios of the materials so brought together lie within the limits set forth above in Table I. For instance, the three ingredients may be mixed together simultaneously, preferably in the presence of a suitable inert solvent, so that the catalyst forms a slurry for convenient handling. Suitable solvents are any of the hydrocarbons containing up to 40 carbons, or preferably up to 16 carbons, such as paraffins on the order of propane, butane, hexane, cyclohexane, petroleum ether, kerosene, diesel oil or the like, or aromatic hydrocarbons such as benzene, toluene, xylene or the like. Alternatively, two of the components may be combined, and the third added later, either before or after the first two have been brought into contact with the butadiene to be polymerized; for instance, the titanium tetrachloride and aluminum alkyl may be combined first, and the elemental iodine added later, either before or after the reaction product of the first two has been introduced into the butadiene. Further, portions of one or more of the ingredients may be withheld at one or more steps in the process, and added later. Thus the titanium tetrachloride and a portion of the aluminum alkyl may be combined first, and thereafter a mixture of the elemental iodine and the remainder of the aluminum alkyl may be added; or the titanium tetrachloride and aluminum alkyl may be reacted first, followed by a portion of the iodine, and then by a mixture of further aluminum alkyl and iodine; and so on. When the catalyst preparation is carried out in two steps, the first being the reduction of the titanium tetrachloride with aluminum alkyl, the aluminum alkyl used in this reduction may be replaced by other powerful reducing agents such as alkali and alkaline earth metals, metal alkyls, hydrides and Grignard reagents, and complexes thereof, such as sodium metal, sodium hydride, lithium butyl, lithium aluminum hydride, lithium aluminum tetraethyl, sodium borohydride, magnesium ethyl chloride, and the like. Another variation consists in the removal of the liquid phase from the preliminary reaction product of the aluminum alkyl and titanium tetrachloride, and thereafter adding the iodine. If all of the liquid phase is thus removed, it will be necessary to restore the reducing character of the system by the addition of aluminum alkyl before the preparation is used as a catalyst. In such cases, in figuring the final compositional ratio requirements of the catalyst as set forth above, the aluminum alkyl originally used should be counted along with any supplemental aluminum alkyl which may be added.

A minor preferred component of obscure function in the catalysts of this invention is an oxidizing agent or oxygen donor, such as molecular oxygen or water. In small scale laboratory preparations, it is almost impossible to avoid getting trace amounts of air and moisture into the reaction zone, and these amounts will serve. In large scale equipment, where the air-cooling surfaces are relatively smaller in proportion to the volume of reactants, the lack of adventitiously introduced oxygen may show up in lower yields and/or less excellent microstructure of the product. The remedy is empirical, namely the deliberate admission of traces of air and/or moisture in amounts indicated by trial in the particular plant to restore the yields and properties of the products. No more particular instructions can be given on this point, since the amount of moisture and/or oxygen required depends on the geometry of the equipment involved. The advantages of oxidizing agents can also be secured by leading the catalyst components through a history of alternating reduction and oxidation. For instance a preliminary reduced reaction product may be prepared by reacting alkyl aluminum and titanium tetrachloride in the ratio of say 1:1 to 3:1. Elemental iodine, in the ratio of say 0.25 to 0.75 gram/atoms for each mole of alkyl aluminum is then added so as to partially re-oxidize the reaction product. Finally, further quantities of alkyl aluminum and (if required) iodine are added to again reduce the catalyst and to bring the net final catalyst composition to that selected for the experiment.

One preferred practice in carrying out the present invention consists in aging the catalyst at some stage in the preparation thereof subsequent to the initial preparation of the reaction product of the aluminum alkyl and titanium tetrachloride. This may be simple aging at temperatures of 25° C. or so for periods of say 18 hours or more. Such aging can be accelerated by heating; for instance heating for 20 minutes at 150° C. will improve the action of the catalysts to the extent that no further aging will have any beneficial effect.

THE POLYMERIZATION PROCEDURE AND PROPERTIES OF THE POLYMERS

The polymerization is carried out by contacting butadiene with the catalyst, preferably at temperatures in the range —40° C. to 150° C., although higher or lower temperatures may be used. Usually, there will be present an inert solvent, which may be, for instance, any of the cyclic or paraffinic hydrocarbons suggested above for the preparation of the catalyst. The reaction medium should be as far as possible free from polar compounds, other than the traces noted above as being helpful in promoting the reaction, which would react with and destroy the catalyst. Preferably, but not necessarily, sufficient pressure is applied to maintain the butadiene in the liquid phase. Likewise, the polymerization process should be agitated to keep the catalyst particles dispersed throughout the polymerization mass, at least until the viscosity has increased to such a degree that the catalyst will no longer settle out. When the polymerizatoin has proceeded to the desired degree, the polymerized butadiene is recovered in any suitable way; for instance, if the reaction has been carried out in a hydrocarbon solvent, the resultant solution can be mixed with methyl ethyl ketone, methanol, isopropanol or other non-solvent for the polymer, which will precipitate in the form of a crumb which can be milled, calendered, extruded, etc. upon conventional rubber machinery. The polymer may also be recovered by evaporating the solvent, for instance by injection into hot water, or passing through a heated extruder, drum drier apparatus or the like. It is also desirable to add reagents such as sodium sulfite or thiosulfate to scavenge any free elemental iodine which may be present or liberated by the action of air, as the iodine may catalyze isomerization of the rubber.

The butadiene polymers produced in accordance with this invention will be found to have the butadiene units polymerized therein to a large extent, say 75% or better, and in the optimum cases 90% or better, in the cis-1,4 configuration. This improved chemical configuration is reflected in the greatly improved rubbery properties of the polymers, the vulcanizates of which have much reduced internal friction, and much better resilience and tensile strength as compared to polybutadienes heretofore prepared.

The proportions of cis-1,4-, trans-1,4 and 1,2-configurations reported hereinafter were determined by infrared analysis. In some cases, the determination was made upon solutions of the polymers, in which event the wave lengths, and the extinction coefficients selected, were as follows:

| Wave length ($\mu$) | Coefficient | | |
|---|---|---|---|
| | Cis-1,4 | Trans-1,4 | 1,2 |
| 6 | 6.43 | 1.3 | 4.4 |
| 10.34 | 1.03 | 109 | 3.0 |
| 10.98 | 4.80 | 7.4 | 145 |

Measurements of the absorbance at 6, 10.34 and 10.98$\mu$ provided data which, together with the extinction coefficients, established the usual three simultaneous linear equations which were solved for the respective absolute concentrations of the several structures. The individual percentages reported were obtained by dividing the absolute amount found for each individual structure by the sum of the absolute amounts of all unsaturated configurations found, so that these figures always total 100%. In some cases, there are reported percentages of total unsaturation found. This is the quotient of the sum of all of the absolute amounts of all configurations found, divided by the absolute amount of unsaturation theoretically present. In other cases the relative concentrations of the several structures was obtained by measurement of the transmission of film samples at wave lengths for the respective structures, and using extinction coefficients, as follows.

| Structure | Cis-1,4 | Trans-1,4 | 1,2 |
| --- | --- | --- | --- |
| Wave length ($\mu$) | 6 | 10.34 | 10.98 |
| Extinction coefficient | 6.4 | 110 | 140 |

In these cases, in order to provide a partial correction for absorption due to other structures, the absorbance measurement for any given wave length was measured on the spectrum chart, not to a base line of 100% transmission, but rather to a line tangent to the transmission maxima on either side of the band under consideration. In such cases, only the relative values, adjusted as above to total 100%, are given. The polymers may be vulcanized by substantially the same sulfur, sulfur and accelerator, peroxide, and other systems by which conventional butadiene-based rubbers are vulcanized, to yield products which are useful in pneumatic tires (particularly as the tread and body stocks thereof), resilient rubber mountings, torsion springs and the like.

With the foregoing general discussion in mind, there are given herewith detailed examples of the practice of this invention. All parts given are by weight.

EXAMPLE I (A) *Reaction of aluminum alkyl and titanium chloride*

Aluminum triethyl solution (in heptane, contains $14.52 \times 10^{-5}$ moles of aluminum triethyl per ml _____ 6.88 ml. (.1 mole AlEt$_3$).
Titanium tetrachloride solution (in heptane, contains $14.52 \times 10^{-5}$ moles of aluminum triethyl per ml _____ 6.88 ml. (.1 mole TiCl$_4$).

A flask provided with a high-speed stirrer and connections for flushing the free space with helium was used in this run. The titanium tetrachloride solution was charged first, high-speed stirring commenced, and the aluminum triethyl solution slowly added. The resultant slurry was pressured over into a storage bottle which was flushed with helium and sealed. The solids content was 0.22 g./ml. This bottle was stored at ordinary room temperature for two months before use in portion "B" of this example described below.

(B) *Removal of soluble reaction products*

All but 100 ml. of the preparation made as described at (A) were used in this step, leaving about $42.7 \times 10^{-3}$ moles of each of the aluminum triethyl and of the titanium tetrachloride (in whatever form they may at that time have assumed) in the entire solution. The supernatant liquid was carefully siphoned off and replaced with 600 ml. of petroleum ether. The slurry was then stirred vigorously and allowed to settle, and the supernatant liquid was decanted and replaced with a fresh 600 ml. of petroleum ether. This was repeated twice again, the last replacement of solvent being made with Decalin sufficient to make up a total volue of 300 ml. This slurry was then refluxed at 180° C. for 1 hour, cooled and transferred to a storage bottle. Assuming that all of the titanium carried through, the preparation contained $1.33 \times 10^{-4}$ gram-atoms of titanium per ml.

(C) *Polymerization*

Benzene _____ ml__ 400
Butadiene _____ g__ 100
Catalyst suspension prepared as described at (B) _____ ml__ 6
Triethyl aluminum-iodine solution (mixture produced by adding 12.7 grams of iodine to 100 ml. of a 1 molar solution of diethyl aluminum in petroleum ether: I/AlEt$_3$ mole ratio 1/1)___ml__ 3

The benzene and butadiene were charged into a 28-ounce beverage bottle, which was flushed with argon. The catalyst suspension was added in 2 ml. portions, the first 4 ml. being decolorized by the residual moisture and oxygen. The triethyl aluminum/iodine solution was next added, and the bottle was then sealed and tumbled in a water bath maintained at 30° C. for 16 hours. The bottle was then cut open, and the contents dropped into a body of isopropanol, stirred to precipitate the polymer and soaked in the isopropanol until the benzene was removed. The polymer was then washed with water on a wash mill with addition of 0.5% of di-t-butyl hydroquinone, and vacuum dried at 50° C. There were obtained 89 grams of a polybutadiene showing by infra-red analysis 90.3% cis-1,4; 6.1% trans-1,4; and 3.5% 1,2-addition, the total unsaturation found being 79.5%.

EXAMPLE II (A) *Reaction of triisobutyl aluminum with titanium tetrachloride*

Petroleum ether _____ ml__ 160
Triisobutyl aluminum solution (1.0 molar, in petroleum ether, 97.0% pure) _____ ml__ 11.5
Titanium tetrachloride solution (1.0 molar, in petroleum ether) _____ ml__ 10

An 8-ounce beverage bottle was dried in an oven, and the petroleum ether distilled into the bottle while it was still warm from the oven. The triisobutyl aluminum and titanium tetrachloride solutions were then added, and the bottle sealed with a crown cap and swirled to mix the contents.

(B) *Polymerization*

Benzene _____ g__ 125
Butadiene _____ g__ 40
Suspension prepared as described at "A" ____ ml__ 2.0
Triisobutyl aluminum/iodine solution (mixture prepared by adding 19.1 grams of iodine to 100 ml. of a 1 molar solution of triisobutyl aluminum in petroleum ether: I/AlBu$_3$ mol ratio 1.5/1___ml__ 2.0

At the time of the experiment, the catalyst suspension prepared as described at "A" was six months old. The benzene and butadiene were charged into an 18-ounce beverage bottle, which was then flushed with argon. The catalyst suspension and the triisobutyl aluminum-iodine solution were charged in the order in which they are listed, and the bottle sealed and tumbled in a water bath at 30° C. for 72 hours. The bottle was then cut open and the polymer separated from the solvent by dropping the mass into isopropanol. The precipitated polymer was washed on a mill with water with addition of 0.25 g. of phenyl beta-naphthylamine. The polymer was then dried in an oven at 90° C. The product weighed 31.5 g. (78.7% yield) and on infra-red analysis showed 82.0% cis-1,4; 14.5% trans-1,4; and 3.5% 1,2-addition.

EXAMPLE III (A) *Preparation of catalyst*

I

| | |
|---|---|
| Decalin | 190 ml. |
| TiCl$_4$ solution (1.0 molar in petroleum ether) | 20 ml. (0.2 mol. TiCl$_4$). |

II

| | |
|---|---|
| Decalin | 110 ml. |
| Aluminum triethyl solution (1.0 molar in petroleum ether) | 30 ml. (.03 mol. AlEt$_3$). |

A flask provided with a rotary stirrer, a dropping funnel, and a connection for flushing with helium was provided for the run. The ingredients (I) were charged into the flask, stirring and flushing commenced, and the ingredients (II) slowly introduced through the dropping funnel, the temperature being kept at 25° C. during the addition. Thereafter the mass was heated and stirred for one-half hour at 140° C. The mass was then cooled and pressured with helium over into a storage bottle previously baked and flushed with helium. Based on a material balance, each ml. of the preparation contains $0.67 \times 10^{-4}$ mol of titanium tetrachloride and $0.86 \times 10^{-4}$ mol of triethyl aluminum, in whatever form these respective compounds may have assumed.

(B) *Poylmerization*

| | | |
|---|---|---|
| Petroleum ether | g | 200 |
| Butadiene | g | 75 |
| Triethyl aluminum solution (1 molar, in heptane) | ml | 0.5 |
| Titanium tetrachloride solution (1 molar, in heptane) | ml | 0.05 |
| Catalyst suspension (prepared as described at "A") | ml | 5 |
| Iodine solution (0.05 molar, in heptane) | ml | 15 |

The petroleum ether and butadiene were charged into a 28-ounce beverage bottle which had previously been baked and flushed with helium. In order to check for contamination, 0.5 ml. of 1 molar triethyl aluminum and .05 ml. of 1 molar TiCl$_4$ was added. A brown coloration was observed, indicating the substantial absence of moisture and oxygen. The catalyst suspension and iodine solution were then added in the order named, and the bottle sealed and tumbled for 16 hours in a water bath maintained at 50° C. The product was worked up as described in Example I. There were obtained 43 grams of polymer (57% conversion) which on infra-red analysis showed 83.5% cis-1,4; 5.8% trans-1,4; and 10.8% 1,2-configuration.

EXAMPLE IV (A) *Preparation of catalyst*

| | |
|---|---|
| Titanium tetrachloride solution (1 molar, in heptane) | 10 ml. (.01 mol., TiCl$_4$). |
| Triethyl aluminum solution (1.2 molar in heptane) | 83.2 ml. (.1 mol. AlEt$_3$). |
| Iodine solution (0.75 molar, in benzene) | 133 ml. (.1 mol. I). |

The above ingredients were charged into a 12-ounce beverage bottle previously flushed with helium, the bottle then being swirled to mix the ingredients.

(B) *Polymerization*

| | | |
|---|---|---|
| Benzene | ml | 100 |
| Butadiene | g | 50 |
| Catalyst suspension (prepared as just described) | ml | 2 |

The catalyst suspension was used in this run immediately after its preparation. The benzene, butadiene and catalyst suspension of the recipe were charged into a 28-ounce beverage bottle, which was then sealed and tumbled in a water bath at 30° C. for 72 hours. The polymer was then worked up as described in Example I. The conversion was 20%, and on infra-red examination, the rubbery polymer showed 85% cis-1,4; 10% trans-1,4; and 5% 1,2-configuration.

EXAMPLE V

| | | |
|---|---|---|
| Petroleum ether | g | 300 |
| Butadiene | g | 100 |
| Solution of iodine and triethyl aluminum (in heptane; 0.067 molar in triethyl aluminum; 0.1 molar in iodine) | ml | 20 |
| Catalyst suspension (prepared as described in Example I-A and B) | ml | 5 |

The above ingredients were charged in the order listed into a 28-ounce beverage bottle, previously baked and flushed with argon. The bottle was then capped and tumbled in a water bath at 30° C. for 72 hours. The polymer was worked up as described in Example I. The conversion was 100%, and the rubbery polymer on infra-red examination showed 85% cis-1,4; 8.4% trans-1,4; and 6.6% 1,2-configuration, the total unsaturation found being 78.6% of the theoretical.

EXAMPLE VI (A) *Preparation of triethyl aluminum-titanium chloride reaction product*

| | Ml. |
|---|---|
| Xylene | 300 |
| Titanium tetrachloride | 25 |
| Triethyl aluminum solution (1.22 molar, in heptane) | 175 |

A flask provided with a stirrer, a dropping funnel, a reflux condenser and a connection for purging the free space with argon was provided for this run. The xylene and titanium tetrachloride were charged, and stirring and purging with argon initiated and continued throughout the process to follow. The triethyl aluminum was added through the dropping funnel over a period of three hours, after which heat was applied to the flask to cause refluxing, which was continued for an additional two hours. The reaction mass was then cooled and pressured over into a storage bottle.

(B) *Preparation of catalyst*

| | Ml. |
|---|---|
| Suspension (prepared as just described at A) | 25 |
| Triethyl aluminum/iodine solution (in heptane; 1 molar in aluminum triethyl, 2 molar in iodine) | 23 |
| Benzene | 77 |

The above ingredients were placed in a storage bottle, previously baked and flushed with argon, the bottle sealed and the contents agitated to thoroughly mix the same.

(C) *Polymerization*

| | | |
|---|---|---|
| Benzene | g | 200 |
| Butadiene | g | 50 |
| Triethyl aluminum solution (1 molar, in heptane) | ml | 1 |
| Catalyst suspension (prepared as described at "C") | ml | 2 |

The above ingredients, in the order named, were charged into a 28-ounce beverage bottle, previously baked and flushed with helium. The bottle was then sealed and tumbled for 16 hours in a water bath maintained at 30° C. The polymer was recovered as described in Example I. There were obtained 44 grams (88% conversion) of a rubbery polymer showing, on infra-red examination, 90% cis-1,4; 5.3% trans-1,4; and 4.7% 1,2-configuration.

EXAMPLE VII.—LARGE SCALE PREPARATION (A) *Preparation of catalyst*

|  | Ml. |
|---|---|
| Decalin | 300 |
| Titanium tetrachloride | 25 |
| Triethyl aluminum solution (1.2 molar, in hexane) | 190 |

A flask provided with a stirrer, reflux condenser, dropping funnel, and connections for flushing with argon was provided for the run. The Decalin and titanium tetrachloride were charged into the flask, and stirring and flushing with argon initiated and maintained throughout the process to follow. The triethyl aluminum solution was introduced over a period of 1 hour, after which the temperature was raised to reflux at 150°–175° C. for two hours. The batch was then cooled, transferred to a storage bottle, and made up with Decalin to a concentration of 0.325 molar in titanium.

(B) *Polymerization*

| | |
|---|---|
| Benzene lbs | 129 |
| Butadiene lbs | 21 |
| First additions: | |
|   Catalyst suspension (prepared as described at "A") ml | 50 |
|   Iodine solution (in benzene, 0.57 molar) ml | 5 |
|   Triethyl aluminum solution (in hexane, 1 molar) ml | 140 |
|   Iodine g | 24 |
| Second additions: | |
|   Catalyst suspension (prepared as described at "A") ml | 50 |
|   Iodine solution (in benzene, 0.57 molar) ml | 5 |
|   Triethyl aluminum solution in hexane, 1 molar) ml | 100 |
|   Iodine g | 17 |
| Third additions: | |
|   Catalyst suspension (prepared as described at "A") ml | 50 |
|   Iodine solution (0.5 molar in benzene) ml | 10 |

A 50-gallon closed stainless steel autoclave provided with a rotary agitator was used in this run. The benzene and butadiene were charged, the vessel purged as well as possible with nitrogen, and agitation commenced and maintained throughout the process. It was difficult to get a good purge, and an undetermined amount of air and/or moisture remained in the apparatus; and the catalyst was therefore added in successive trial portions until polymerization was secured. To this end, the ingredients bracketed at "First Additions" were added initially, the catalyst suspension and iodine solution being premixed and added first, and the triethyl aluminum solution and iodine being premixed and added next. No polymerization had taken place at the end of 18 hours, so the addition procedure was repeated with the quantities of ingredients bracketed at "Second Additions." At the end of a further 18 hours, no polymerization had yet taken place, and the ingredients bracketed at "Third Additions" were premixed and added to the reactor. Polymerization shortly set in and continued over a period of 24 hours, the temperature rising to a maximum of 46° C. during that period. The polymer was recovered by discharging the polymerization vessel into an agitated body of methanol, and washing the polymer with water on a wash mill with addition of 0.1 lb. of phenyl beta-naphthylamine as a stabilizer. There were obtained 18 lbs. (86% conversion) of a rubbery polymer having a gel content of 3.7% and an inherent viscosity of 3.4, and exhibiting on infra-red analysis 87.5% cis-1,4; 8.3% trans-1,4; and 4.2% 1,2-configuration, the total found being 76.7% of the theoretical.

EXAMPLE VIII.—LARGE SCALE PREPARATION

| | |
|---|---|
| Benezene lbs | 129 |
| Butadiene lbs | 21 |
| Catalyst suspension (prepared as described in Example VII–A) ml | 100 |
| Iodine solution (in hexane, 0.75 molar) ml | 5 |
| Solution of tetraethylaluminum and iodine (in heptane; 1 molar in AlEt$_3$ and 1.05 molar in I) ml | 225 |

A 50-gallon closed stainless steel autoclave provided with a rotary agitator was used in this run. In this run the reactor had been used in previous similar runs, so that a good purge and decontamination was achieved. Under these conditions, the experience had been that the difficulties attending excessive freedom from atmospheric contamination were experienced. In the present run, these difficulties were overcome by reoxidation with the iodine solution listed in the recipe. The benzene and butadiene were charged first, the vessel purged with nitrogen, and agitation initiated and maintained throughout the run. The catalyst suspension and iodine solution were premixed and added to the solution of tetraethyl aluminum and iodine, and the net mixture charged into the reactor. Polymerization set in, the temperature rising to a maximum of 30° C., and at the end of 24 hours the reaction mixture was discharged and worked up as described in Example VII. There were obtained 12.6 lbs. (88% conversion) of a rubbery polymer having 0.3% gel and an inherent viscosity of 6.06. On infra-red examination, the polymer showed 85.5% cis-1,4; 10.9% trans-1,4; and 3,6% 1,2-configuration, the total found being 76.6%.

EXAMPLE IX

| | |
|---|---|
| Butadiene g | 100 |
| Benzene g | 400 |
| Catalyst suspension (prepared as described in Example VI–B) [1] ml | 4 |
| Triethyl aluminum | Varied. |
| Iodine | Varied. |

[1] For runs 8–19 of Table II; prepared by the same process, but with an I/Ti ratio of 2.1 for runs 1–6 of Table II.

A series of runs was made in accordance with the foregoing schedule, varying the amounts of triethyl aluminum and of iodine. In each run the butadiene and benzene were charged into a 28-ounce beverage bottle which was flushed with nitrogen. In order to scavenge any oxygen, or other impurities reacting with aluminum triethyl or titanium tetrachloride in the system, a trace of titanium tetrachloride was added as an indicator, and triethyl aluminum added slowly until a faint brown coloration appeared. The catalyst suspension, triethyl aluminum and iodine, in the proportions selected for the run, were then premixed and added to the bottle, which was then sealed and tumbled in a water bath at a temperature selected for the run. At the conclusion of the run the polymer was recovered as in Example I. Set forth herewith in Table II are the net ratios, in the final catalysts, of gram-atoms of iodine to titanium, and of aluminum to titanium, selected for the runs, together with the yields and properties of the products.

Table II

| Gram-atom ratios | | Polymerization temp. (° C.) | Conversion | Properties of polymer | | | | | Run No. |
|---|---|---|---|---|---|---|---|---|---|
| | | | | Inherent viscosity | Gel, percent | Structures, percent | | | |
| I/Ti | Al/Ti | | | | | Cis-1,4 | Trans-1,4 | 1,2 | |
| 1.05 | 2.79 | 30 | 88 | -------- | ------- | 90 | 5.7 | 4.4 | 1 |
| | 2.85 | 30 | 75 | -------- | ------- | 86.3 | 9.1 | 4.7 | 2 |
| | 3.17 | 30 | 62 | -------- | ------- | 90 | 5.0 | 5.0 | 3 |
| | 3.17 | 10 | 40 | -------- | ------- | 81.1 | 14.2 | 4.6 | 4 |
| | 4.25 | 30 | 37 | -------- | ------- | 90 | 5.2 | 4.7 | 5 |
| | 6.5 | 30 | 44 | -------- | ------- | 79.1 | 13.6 | 7.3 | 6 |
| 2.1 | 6.5 | 30 | 57 | -------- | ------- | 87 | 7.8 | 5.2 | 7 |
| | 4.2 | 5 | 98 | 6.0 | 0 | 89.0 | 6.7 | 4.4 | 8 |
| | *4.2 | 5 | 26 | 2.8 | 0 | 88.7 | 7.1 | 4.2 | 9 |
| | 5.5 | 30 | 98 | 4.2 | 0 | 87.9 | 7.1 | 5.0 | 10 |
| | 6.5 | 30 | 70 | 3.4 | 0 | 87.0 | 7.6 | 5.4 | 11 |
| 4 | *6.5 | 30 | 32 | 2.2 | 0 | 86.1 | 8.8 | 5.1 | 12 |
| | 7.5 | 5 | 88 | 4.4 | 0 | 88.2 | 7.0 | 4.9 | 13 |
| | 8.5 | 5 | 96 | 4.2 | 0 | 89.6 | 6.3 | 4.1 | 14 |
| | 10.8 | 5 | 84 | 4.6 | 0 | 90.1 | 5.8 | 4.2 | 15 |
| | 11.9 | 5 | 76 | 2.7 | 0 | 89.5 | 6.1 | 4.4 | 16 |
| | 14.2 | 5 | 84 | 1.1 | 0 | 82.0 | 12.1 | 5.8 | 17 |
| | 11.3 | 30 | 98 | 2.8 | 0.5 | 86.5 | 8.3 | 5.1 | 18 |
| 11.3 | 11.3 | 5 | 62 | 2.9 | 0.7 | 88.0 | 7.4 | 4.6 | 19 |
| | 11.3 | 5 | 80 | 2.2 | 1.5 | 78.8 | 16.2 | 5.0 | 20 |
| 16.5 | *11.3 | 5 | 90 | 2.7 | 1.3 | 82.1 | 12.5 | 5.4 | 21 |
| | *11.3 | 5 | 86 | 2.7 | 2.0 | 82.4 | 12.3 | 5.3 | 22 |
| 20.7 | *11.3 | 5 | 100 | 3.9 | 1.0 | 85.2 | 10.1 | 4.6 | 23 |

*Catalyst quantity reduced to one-half of that in recipe.

EXAMPLE X.—VULCANIZATES-TIRE TREAD STOCKS

Table III

| | Stock No. 1, Parts by Weight | Stock No. 2, Parts by Weight |
|---|---|---|
| Hevea rubber | 50 | 50 |
| Polybutadiene of Example VII | 50 | -------- |
| Polybutadiene of Example VIII | -------- | 50 |
| HAF Black | 50 | 50 |
| Sulfur | 1.75 | 1.75 |
| Santocure NS (manufactured by Monsanto Chemical Co.) | 0.6 | 0.6 |

VULCANIZATE PROPERTIES

| | | |
|---|---|---|
| Modulus (p.s.i.) | 1,400 | 1,525 |
| Tensile strength (p.s.i.) | 2,900 | 3,000 |
| Elongation at break (percent) | 520 | 490 |
| Running temperature, ° F | 247 | 243 |
| Blowout time (min.) | 19 | 21 |

Stocks Nos. 1 and 2 were made up from the ingredients set forth in Table III, and cured at 280° F. for 60 minutes. The properties of the resulting vulcanizates were determined and are set forth in the table. It will be seen that these properties are quite acceptable for tire tread applications, being in fact quite excellent in respect to running temperature and blowout time.

The same stocks were also extruded as tread sections, and built upon standard SBR tire bodies, the assemblies being cured 51 minutes at 291° F. These tires have given several weeks' satisfactory performance in road tests still in progress.

EXAMPLE XI (A) *Catalyst preparation*

Titanium tetrachloride _____ 25 ml. (0.228 ml.)
Aluminum triethyl solution (1.0 molar, in heptane) _____ 225 ml.
n-Heptane _____ 300 ml.

A 1-liter creased flask provided with a high-speed stirrer, dropping funnel, reflux condenser and connections for maintaining an argon atmosphere was used in this preparation. The titanium tetrachloride and heptane were charged first, stirring commenced, and the titanium tetrachloride added through the dropping funnel over a period of 1 hour. The temperature was then raised to reflux for 1 hour. The reaction mass was then cooled and transferred to a storage bottle, 250 ml. of additional heptane being used as a rinse. The final preparation (hereinafter designated suspension "X") contained $0.284 \times 10^{-3}$ mols of titanium tetrachloride and of triethyl aluminum per ml.

Suspension X (prepared as just described) ____ml__ 25
Heptane _____ml__ 55
Iodine _____g__ 0.54

The above ingredients were placed in a storage bottle flushed with argon, and thoroughly agitated. In the resultant preparation (hereinafter designated suspension "Y"), the concentration of titanium tetrachloride and of aluminum triethyl was $0.089 \times 10^{-3}$ mols per ml., and the I/Ti ratio was 0.5.

(B) *Polymerization*

Hexane _____g__ 150
Butadiene _____g__ 50
Titration:
    $TiCl_4$ solution (0.1 molar, in heptane) ___ml__ 0.5
    Aluminum triethyl solution (0.2 molar in heptane) _____ml__ 5.0
Mixed iodine-aluminum triethyl solution (in heptane, 0.1 molar in $AlEt_3$, 2.0 molar in I) _____ml__ 5
Catalyst preparation, (final suspension "Y" prepared, as described at A) _____ml__ 2

The hexane and butadiene were charged into a 12-ounce beverage bottle and then flushed with nitrogen. The titanium tetrachloride was then added as an indicator, and the aluminum chloride added until a brown coloration appeared. The mixed iodine-aluminum triethyl solution was then added, followed by the catalyst preparation "Y," and the bottle sealed and tumbled in a water bath at 30° C. for 18 hours. The polymer was recovered by precipitation in the usual way, and amounted to 47 grams (94% conversion). Infra-red analysis showed 86.0% cis-1,4; 8.7% trans-1,4 and 5.4% 1,2-structure.

EXAMPLE XII

| | |
|---|---|
| Butadiene | 30 pounds. |
| Benzene | 120 pounds. |
| Catalyst suspension "X" (prepared as described in Example XI) | 100 ml. |
| Iodine solution (0.75 molar in heptane) | 20 ml. |
| Aluminum triethyl solution (1 molar in heptane) | 130 ml. |
| Iodine | 12.6 g. |
| Air | 1.67 l. at 50 p.s.i.g. |

A 50-gallon stainless steel autoclave provided with an anchor type stirrer was used in this preparation. The butadiene and benzene were charged, and the free space purged as well as possible with argon. A 100-ml. aliquot was removed, 1 ml. of titanium tetrachloride added as an indicator, and the solution was titrated with 0.1 molar aluminum triethyl until a brown coloration appeared. Agitation in the reactor was initiated and a corresponding quantity of aluminum triethyl was then added to the reaction vessel to scavenge any oxygen-bearing contaminants therefrom. The suspension "X" and iodine solution were then premixed and added to the reactor, followed by the aluminum triethyl solution and iodine. The reactor temperature was adjusted to 30° C.

At the end of 5 hours, no polymerization had set in. A steel bomb of 1.67 liter capacity and containing air at 50 p.s.i.g. was placed in communication with the reactor, wherein the pressure was at 15 p.s.i.g., and allowed to discharge the air into the reactor until its pressure was in equilibrium with that in the reactor. Polymerization set in immediately, the temperature rising to 100° F. The reactor was discharged at the end of 18 hours and the polymer worked up as described in Example VIII. There were obtained 30 lbs. of a rubbery product which on infra-red examination showed 87.0% cis-1,4; 7.5% trans-1,3; and 5.5% 1,2-structure. The polymer contained no gel, and had an inherent viscosity of 3.81.

EXAMPLE XIII (A) *Catalyst preparation*

A catalyst suspension (hereinafter designated "Z") was prepared as described in Example VI-B except that the ratio of aluminum to titanium was 1.0 and the concentration of titanium was $0.09 \times 10^{-3}$ mols/ml.

(B) *Polymerization*

| | |
|---|---|
| Butadiene | 50 grams. |
| Benzene | 100 grams. |
| Catalyst suspension "Z" | 2 ml. |
| Iodine-triethyl aluminum solution (in heptane; 0.2 molar in aluminum triethyl and in iodine) | Q.s. to yield catalyst compositions of Table IV. |

A series of runs was made in acordance with the above recipe, varying the amount of iodine-triethyl aluminum solution from run to run to give the catalyst component ratios indicated in Table IV. In each case, the butadiene and benzene were charged into a 12-ounce beverage bottle, the free space of which was purged with argon. The contents were then titrated in the usual manner with triethyl aluminum in the presence of a titanium tetrachloride indicator to scavenge the oxygen-yielding compounds in the mass. The catalyst suspension "Z" and selected amount of iodine-triethyl aluminum solution were then added, and the bottle capped and tumbled in a water bath at 30° C. for 16 hours. The polymer was recovered as described in Example I. Tabulated herewith are the particulars of the several runs.

*Table IV*

| Net mole ratios in catalyst | | | Percent conversion | Cis-1,4 | Trans-1,4 | 1,2 | Run No. |
|---|---|---|---|---|---|---|---|
| I/Ti | Al/Ti | I/Al | | | | | |
| 2.72 | 3.22 | 0.85 | 90 | 90.7 | 4.5 | 4.9 | 1 |
| 4.94 | 4.32 | 1.14 | 90 | 91.5 | 4.0 | 4.6 | 2 |
| 6.05 | 3.78 | 1.60 | 26 | 91.5 | 4.1 | 4.4 | 3 |
| 6.05 | 6.00 | 1.00 | 88 | 87.8 | 6.7 | 5.5 | 4 |
| 6.05 | 9.34 | 0.65 | 42 | 86.1 | 8.4 | 5.5 | 5 |
| a11.6 | 6.50 | 1.78 | 98 | 84 | 9.9 | 5.6 | 6 |
| a22.7 | 12.1 | 1.87 | 90 | 85 | 9.0 | 5.9 | 7 |
| b44.9 | 23.3 | 1.92 | 94 | 88.5 | 6.5 | 5.0 | 8 | a Only 1 ml. of catalyst suspension Z used in these runs.
b Only 0.5 ml. of catalyst suspension Z used in this run.

From the foregoing general description and detailed specific examples, it will be evident that this invention provides a novel process and catalyst for the polymerization of butadiene to yield polymers having greatly improved polymeric structure from the standpoint of cis-1,4 structure, and yielding rubbery vulcanizates of superior properties.

What is claimed is:

1. Process of polymerizing butadiene to yield polymers containing the polymerized butadiene units largely in cis-1,4 configuration therein, which comprises contacting butadiene, at temperatures in the range −40° C. to 150° C., with a catalyst which is a reaction product of an aluminum alkyl selected from the group consisting of aluminum trialkyls, dialkyl aluminum monochlorides and monoalkyl aluminum dichlorides in which the alkyl groups contain from 1 to 30 carbon atoms, with titanium tetrachloride and elemental iodine, the molar ratios of the components entering into the catalyst being as follows:

$$\frac{E}{\text{Moles of titanium tetrachloride}} = 1/1 \text{ to } 30/1$$

$$\frac{\text{Gram-atoms of iodine}}{\text{Moles of titanium tetrachloride}} = 0.25/1 \text{ to } 50/1$$

the symbol E being the sum of the moles of aluminum trialkyls, plus ⅔ of the moles of aluminum dialkyls, plus ⅓ of the moles of aluminum monoalkyls in the system.

2. Process of polymerizing butadiene to yield polymers containing the polymerized butadiene units largely in cis-1,4 configuration therein, which comprises contacting butadiene, at temperatures in the range −40° C. to 150° C., with a catalyst which is a reaction product of (A) an initial reaction product of an aluminum trialkyl in which the alkyl groups contain from 1 to 30 carbon atoms with titanium tetrachloride, the mole ratio of aluminum trialkyl to titanium tetrachloride entering into the initial reaction product being from 1:1 to 3:1 with (B) elemental iodine, the molar ratios of the components entering into the catalyst being as follows:

$$\frac{\text{Moles of aluminum trialkyl}}{\text{Moles of titanium tetrachloride}} = 1/1 \text{ to } 30/1$$

$$\frac{\text{Gram-atoms of iodine}}{\text{Moles of titanium tetrachloride}} = 0.25/1 \text{ to } 50/1$$

3. Process of polymerizing butadiene to yield polymers containing the polymerized butadiene units largely in cis-1,4 configuration therein, which comprises contacting butadiene, at temperatures in the range −40° C. to 150° C., with a catalyst which is a reaction product of (A) an initial reaction product of an aluminum triethyl with titanium tetrachloride, the mole ratio of aluminum triethyl to titanium tetrachloride entering into the initial reaction product being from 1:1 to 3:1 with (B) elemental iodine, the molar ratios of the components entering into the catalyst being as follows:

$$\frac{\text{Moles of aluminum triethyl}}{\text{Moles of titanium tetrachloride}} = 1/1 \text{ to } 30/1$$

$$\frac{\text{Gram-atoms of iodine}}{\text{Moles of titanium tetrachloride}} = 0.25/1 \text{ to } 50/1$$

4. Process of polymerizing butadiene to yield polymers containing the polymerized butadiene units largely in cis-1,4 configuration therein, which comprises contacting butadiene, at temperatures in the range −40° C. to 150° C., with a catalyst which is produced by reacting (A) an aluminum trialkyl in which the alkyl groups contain from 1 to 30 carbon atoms with titanium tetrachloride, the ratio of trialkyl aluminum to titanium tetrachloride entering into the initial reaction product being from 1:1 to 3:1 thereafter adding (B) elemental iodine, the amount of iodine so added being 0.25 to 0.75 gram-atom per mole of aluminum trialkyl employed in stage (A), and thereafter adding further quantities of aluminum trialkyl and iodine, the molar ratios of the components entering into the final catalyst being as follows:

$$\frac{\text{Moles of aluminum trialkyl}}{\text{Moles of titanium tetrachloride}} = 1/1 \text{ to } 30/1$$

$$\frac{\text{Gram-atoms of iodine}}{\text{Moles of titanium tetrachloride}} = 0.25/1 \text{ to } 50/1$$

5. Process of polymerizing butadiene to yield polymers containing the polymerized butadiene units largely in cis-1,4 configuration therein, which comprises contacting butadiene, at temperatures in the range −40° C. to 150° C. with a catalyst which is a reaction product of (A) an initial reaction product of an aluminum trialkyl in which the alkyl groups contain from 1 to 30 carbon atoms with titanium tetrachloride, the mole ratio of aluminum trialkyl to titanium tetrachloride entering into the initial reaction product being from 1:1 to 3:1 with (B) elemental iodine, the molar ratios of the components entering into the catalyst being as follows:

$$\frac{\text{Moles of aluminum trialkyl}}{\text{Moles of titanium tetrachloride}} = 1/1 \text{ to } 30/1$$

$$\frac{\text{Gram-atoms of iodine}}{\text{Moles of titanium tetrachloride}} = 0.25/1 \text{ to } 50/1$$

the liquid phase being removed after the reaction between the aluminum trialkyl and titanium tetrachloride, and sufficient addition aluminum trialkyl being added thereafter to bring the ratio of aluminum trialkyl to the other ingredients within the limits above set forth, counting as aluminum trialkyl both the original and newly added aluminum trialkyl.

6. Process of polymerizing butadiene to yield polymers containing the polymerized butadiene units largely in cis-1,4 configuration therein, which comprises contacting butadiene, at temperatures in the range −40° C. to 150° C., with a catalyst which is a reaction product of an aluminum trialkyl in which the alkyl groups contain from 1 to 30 carbon atoms with titanium tetrachloride and with elemental iodine, the molar ratios of the components entering into the catalyst being as follows:

$$\frac{\text{Moles of aluminum trialkyl}}{\text{Moles of titanium tetrachloride}} = 1/1 \text{ to } 30/1$$

$$\frac{\text{Gram-atoms of iodine}}{\text{Moles of titanium tetrachloride}} = 0.25/1 \text{ to } 50/1$$

a trace of an oxygen-containing gas being injected into the reaction mass before the polymerization set in.

7. Process of polymerizing butadiene to yield polymers containing the polymerized butadiene units largely in cis-1,4 configuration therein, which comprises contacting butadiene, at temperatures in the range −40° C. to 150° C., with a catalyst which is produced by reacting (A) aluminum triethyl with titanium tetrachloride, the mol ratio of triethyl aluminum to titanium tetrachloride entering into the initial reaction product being from 1:1 to 3:1, thereafter adding (B) elemental iodine, the amount of iodine so added being 0.25 to 0.75 gram-atom per mole of aluminum triethyl employed in stage (A), and thereafter adding further quantities of aluminum triethyl and iodine, the molar ratios of the components entering into the final catalyst being as follows:

$$\frac{\text{Moles of aluminum triethyl}}{\text{Moles of titanium tetrachloride}} = 1/1 \text{ to } 30/1$$

$$\frac{\text{Gram-atoms of iodine}}{\text{Moles of titanium tetrachloride}} = 0.25/1 \text{ to } 50/1$$

8. Process of polymerizing butadiene to yield polymers containing the polymerized butadiene units largely in cis-1,4 configuration therein, which comprises contacting butadiene, at temperatures in the range −40° C. to 150° C., with a catalyst which is a reaction product of aluminum triethyl and titanium tetrachloride and with elemental iodine, the molar ratios of the components entering into the catalyst being as follows:

$$\frac{\text{Moles of aluminum triethyl}}{\text{Moles of titanium tetrachloride}} = 1/1 \text{ to } 30/1$$

$$\frac{\text{Gram-atoms of iodine}}{\text{Moles of titanium tetrachloride}} = 0.25/1 \text{ to } 50/1$$

a trace of an oxygen-containing gas being injected into the reaction mass before the polymerization sets in.

9. A catalytic composition, capable of catalyzing the polymerization of butadiene to form polymers in which the polymeric butadiene units occur largely in the cis-1,4 configuration, which is a reaction product of an aluminum alkyl selected from the group consisting of aluminum trialkyls, dialkyl aluminum monochlorides and monoalkyl aluminum dichlorides in which the alkyl groups contain from 1 to 30 carbon atoms, with titanium tetrachloride and with elemental iodine, the molar ratios of the components entering into the caatlyst being as follows:

$$\frac{E}{\text{Moles of titanium tetrachloride}} = 1/1 \text{ to } 30/1$$

$$\frac{\text{Gram-atoms of iodine}}{\text{Moles of titanium tetrachloride}} = 0.25/1 \text{ to } 50/1$$

the symbol E being the sum of the moles of aluminum trialkyls, plus ⅔ of the moles of aluminum dialkyls, plus ⅓ of the moles of aluminum monoalkyls, in the system.

10. A catalytic composition, capable of catalyzing the polymerization of butadiene to form polymers in which the polymeric butadiene units occur largely in the cis-1,4 configuration, which is a reaction product of (A) an initial reaction product of an aluminum trialkyl in which the alkyl groups contain from 1 to 30 carbon atoms with titanium tetrachloride, the mole ratio of aluminum trialkyl to titanium tetrachloride into the initial reaction product being from 1:1 to 3:1 with (B) elemental iodine, the molar ratios of the components entering into the catalyst being as follows:

$$\frac{\text{Moles of aluminum trialkyl}}{\text{Moles of titanium tetrachloride}} = 1/1 \text{ to } 30/1$$

$$\frac{\text{Gram-atoms of iodine}}{\text{Moles of titanium tetrachloride}} = 0.25/1 \text{ to } 50/1$$

11. A catalytic composition, capable of catalyzing the polymerization of butadiene to form polymers in which the polymeric butadiene units occur largely in the cis-1,4 configuration, which is a reaction product of (A) an initial reaction product of aluminum triethyl with titanium tetrachloride, the mole ratio of aluminum triethyl to titanium tetrachloride entering into the initial reaction product being from 1:1 to 3:1 with (B) elemental iodine, the molar ratios of the components entering into catalyst being as follows:

$$\frac{\text{Moles of aluminum triethyl}}{\text{Moles of titanium tetrachloride}} = 1/1 \text{ to } 30/1$$

$$\frac{\text{Gram-atoms of iodine}}{\text{Moles of titanium tetrachloride}} = 0.25/1 \text{ to } 50/1$$

12. A catalytic composition, capable of catalyzing the polymerization of butadiene to form polymers in which the polymeric butadiene units occur largely in the cis-1,4 configuration, which is produced by reacting (A) an aluminum trialkyl in which the alkyl groups contain from 1 to 30 carbon atoms with titanium tetrachloride, the ratio of trialkyl aluminum to titanium tetrachloride entering into the initial reaction product being from 1:1 to 3:1, thereafter adding (B) elemental iodine, the amount of iodine so added being 0.25 to 0.75 gram-atom per mole of aluminum trialkyl employed in stage (A), and thereafter adding further quantities of aluminum trialkyl and iodine, the molar ratios of the components entering into the final catalyst being as follows:

$$\frac{\text{Moles of aluminum trialkyl}}{\text{Moles of titanium tetrachloride}} = 1/1 \text{ to } 30/1$$

$$\frac{\text{Gram-atoms of iodine}}{\text{Moles of titanium tetrachloride}} = 0.25/1 \text{ to } 50/1$$

13. A catalytic composition, capable of catalyzing the polymerization of butadiene to form polymers in which the polymeric butadiene units occur largely in the cis-1,4 configuration which is a reaction product of (A) an initial reaction product of an aluminum trialkyl with the alkyl groups containing from 1 to 30 carbon atoms with titanium tetrachloride, the mole ratio of aluminum trialkyl to titanium tetrachloride entering into the initial reaction product being from 1:1 to 3:1 with (B) elemental iodine, the molar ratios of the components entering into the catalyst being as follows:

$$\frac{\text{Moles of aluminum trialkyl}}{\text{Moles of titanium tetrachloride}} = 1/1 \text{ to } 30/1$$

$$\frac{\text{Gram-atoms of iodine}}{\text{Moles of titanium tetrachloride}} = 0.25/1 \text{ to } 50/1$$

the liquid phase being removed after the reaction between the aluminum trialkyl and titanium tetrachloride, and sufficient additional aluminum trialkyl being added thereafter to bring the ratio of aluminum trialkyl to the other ingredients within the limits above set forth, counting as aluminum trialkyl both the original and newly added aluminum trialkyl.

14. A catalytic composition, capable of catalyzing the polymerization of butadiene to form polymers in which the polymeric butadiene units occur largely in the cis-1,4 configuration, which is produced by reacting (A) aluminum triethyl with titanium tetrachloride, the ratio of triethyl aluminum to titanium tetrachloride entering into the initial reaction product being from 1:1 to 3:1, thereafter adding (B) elemental iodine, the amount of iodine so added being 0.25 to 0.75 gram-atom per mole aluminum triethyl employed in stage (A), and thereafter adding further quantities of aluminum triethyl and iodine, the molar ratios of the components entering into the final catalyst being as follows:

$$\frac{\text{Moles of aluminum triethyl}}{\text{Moles of titanium tetrachloride}} = 1/1 \text{ to } 30/1$$

$$\frac{\text{Gram-atoms of iodine}}{\text{Moles of titanium tetrachloride}} = 0.25/1 \text{ to } 50/1$$

15. A process for the polymerization of 1,3-butadiene to a polymer containing a high percentage of cis-1,4-addition which comprises contacting said butadiene with a catalyst comprising (a) an aluminum trialkyl, (b) titanium tetrachloride, and (c) iodine, the mol ratio of said aluminum trialkyl to the total molar quantities of said titanium tetrachloride and iodine being greater than 1.

References Cited by the Examiner

UNITED STATES PATENTS

| | | | |
|---|---|---|---|
| 2,822,357 | 2/58 | Brebner et al. | 260—94.9 |
| 2,846,427 | 8/58 | Findlay | 260—94.3 |
| 2,868,772 | 1/59 | Ray et al. | 260—94.3 |
| 2,910,461 | 10/59 | Nowlin et al. | 260—94.3 |
| 2,914,515 | 11/59 | Stuart | 260—94.3 |
| 2,943,063 | 6/60 | Eby | 260—94.3 |

FOREIGN PATENTS

| | | |
|---|---|---|
| 218,210 | 11/58 | Australia. |
| 552,578 | 5/57 | Belgium. |
| 789,781 | 1/58 | Great Britain. |

OTHER REFERENCES

Gaylord et al.: "Linear and Stereoregular Addition Polymers," p. 157, Interscience Publishers, Inc., N.Y. 1959.

JOSEPH L. SCHOFER, *Primary Examiner.*

D. ARNOLD, M. LIEBMAN, L. H. GASTON,
*Examiners.*